United States Patent

Bovett

[15] 3,703,707

[45] Nov. 21, 1972

[54] DUAL CLOCK MEMORY ACCESS CONTROL

[72] Inventor: Duane E. Bovett, Claremont, Calif.

[73] Assignee: Burroughs Corporation, Detroit, Mich.

[22] Filed: April 28, 1971

[21] Appl. No.: 138,254

[52] U.S. Cl. ..................................................340/172.5

[51] Int. Cl. .................................G06f 3/04, G06f 9/18

[58] Field of Search ......................................340/172.5

[56] References Cited

UNITED STATES PATENTS

| | | | |
|---|---|---|---|
| 3,510,843 | 5/1970 | Bennett et al. | 340/172.5 |
| 3,478,321 | 11/1969 | Cooper et al. | 340/172.5 |
| 3,408,632 | 10/1968 | Hauck | 340/172.5 |
| 3,341,818 | 9/1967 | Mackie et al. | 340/172.5 |
| 3,582,896 | 6/1971 | Silber | 340/172.5 |

*Primary Examiner*—Gareth D. Shaw
*Attorney*—Christie, Parker & Hale

[57] ABSTRACT

There is described a control for accessing the main memory of a digital computer from a processor or a number of input/output control units on a time-sharing basis where the processor operates at a clock rate twice the speed of the input/output control devices. A buffering arrangement is provided which permits overlapping of the servicing of the input/output devices and the servicing of the processor which permits the processor to access memory between each input/output device memory access while still permitting the input/output devices to be serviced on a continuous basis.

7 Claims, 3 Drawing Figures

INVENTOR.
DUANE E. BOVETT
BY
Christie, Parker & Hale
ATTORNEYS

DUAL CLOCK MEMORY ACCESS CONTROL

FIELD OF THE INVENTION

This invention relates to digital computers, and more particularly, is concerned with a memory access control which permits time-sharing between one or more processors and a plurality of input/output devices in accessing memory.

BACKGROUND OF THE INVENTION

In U.S. Pat. No. 3,526,878 there is described a digital computer system in which a processor and a plurality of input/output control devices access main memory on a time-sharing basis utilizing an address memory which provides address information for each input/output channel and for the processor. A central control provides access to memory by any of the input/output control units or the processor on a fixed priority basis, with the processor having lowest priority.

While improved circuit techniques have made it possible to greatly increase the speed of operation of the processor and main memory in a system such as that described in the above-identified patent, a corresponding increase in speed of the peripheral devices has not been achieved or may be undesirable. It therefore becomes necessary to be able to operate the processor at a much higher clock rate than the input/output devices. However, merely increasing the clock rate at which the processor is capable of operating, does not achieve the desired results, if the processor is required to wait because of its low priority status on the servicing of an input/output control device through a memory access at the relatively low clock rate of the input/output control device.

SUMMARY OF THE INVENTION

The present invention provides an arrangement in which the processor is granted access to main memory on an absolute basis during every other main memory access cycle. During the alternate main memory access cycles, the input/output control devices and the processor gain access to main memory on a fixed priority basis with the processor having lowest priority. Because the input/output control devices are serviced at a slower clock rate than the processor, the servicing of the input/output control devices is not affected by the servicing of the processor during alternate main memory cycles. The present invention permits the servicing of the input/output control devices to overlap the servicing of the higher speed processor, thus permitting the input/output devices to be serviced just as though the processor had no priority over the servicing of the input/output devices. In other words, the processor alternately has highest priority and lowest priority access to memory without affecting operation of the input/output devices.

This is accomplished in brief by providing a separate address memory associated with the main memory for storing addresses of blocks in memory assigned respectively to the processor and to the input/output units. A control circuit, in response to access requests from any of the relatively slow input/output control units, initiates a control cycle for servicing the highest priority requesting unit. The control cycle causes a transfer of an address from the address memory associated with the input/output units into a buffer register and then into the address register of the main memory. The control circuit, in response to an access request from the processor, initiates a control cycle for servicing the processor by causing a transfer from the address memory associated with the processor directly to address register of the main memory. This allows the servicing of the input/output device, which takes place at half the clock rate as the servicing of the processor, to overlap the servicing of the processor.

BRIEF DESCRIPTION OF THE DRAWINGS

For a better understanding of the invention reference should be made to the accompanying drawings wherein.

DETAILED DESCRIPTION

Figure 1:
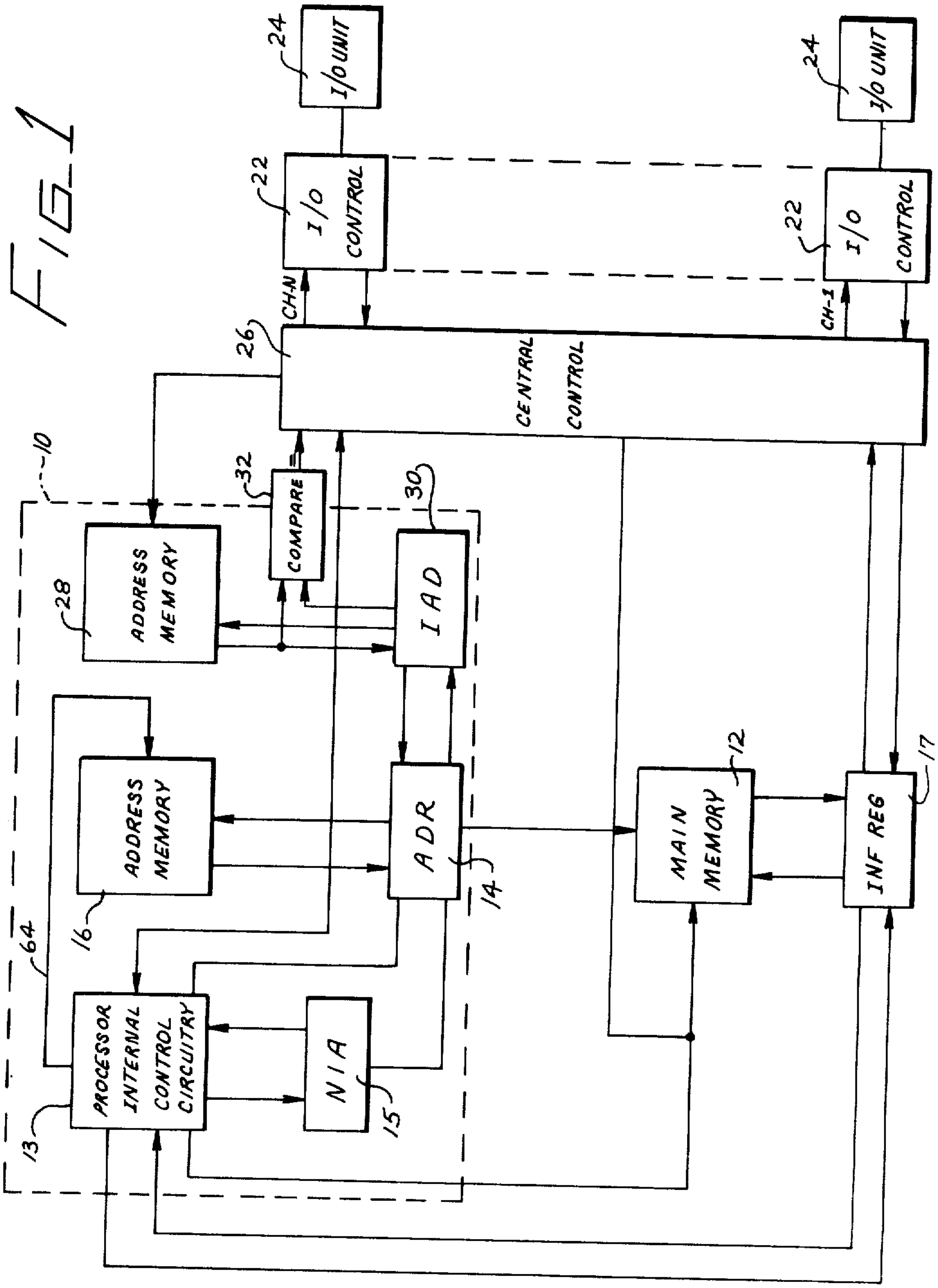
FIG. 1 is a block diagram of a computer system incorporating the features of the present invention.

Referring to FIG. 1 in detail, there is shown a computer system which incorporates the present invention. The numeral 10 indicates generally a central processing unit which time-shares a main memory 12 with a plurality of input/output channels. Each channel includes an I/O control 22 and an I/O unit 24 which may, for example, be a magnetic tape unit, a magnetic disc file, a card reader, or the like. Access to the main memory 12 by the processor and the input/output units is controlled by a central control unit 26. By time-sharing main memory 12, a plurality of input/output operations may proceed simultaneously with the operation of the central processing unit. When the processor or any of the I/O control units seeks access to main memory it generates an access request signal to the central control unit 26. As will be described hereinafter in detail, the central control unit then handles these requests on a priority basis and grants access to one of the requesting units at a time.

The present invention is concerned with the allocation of memory accesses where the processor 10 is arranged to operate at a clock frequency which is twice as fast as the clock frequency at which the I/O control units 22 are capable of operating. Thus the servicing of an I/O control unit and its associated I/O unit over an I/O channel is at half the speed of the servicing of the processor 10. Memory accesses by the processor 10 are initiated by the processor internal control circuitry indicated at 13. When the processor requires access to main memory, an Access Granted level is provided by the central control 26 when the processor has priority. The processor internal control circuitry then provides an address to an Address register (ADR) 14. This address may be derived from a Next Instruction Address register (NIA) 15 or from an address memory 16 which stores a plurality of data areas in main memory which are assigned to the processor. Once the address is placed in the address register 14, a memory Read or Write operation is initiated by the processor control circuitry 13. Information is read from main memory into an Information register (INF) 17 from which it is transferred into the processor 10. Similarly information is transferred from selected registers in the processor 10 into the INF register 17 for writing into the main memory 12.

When access is granted to one of the I/O controls 22, it directs a signal through the centeral control 26 to an address memory 28. The address memory 28 contains addresses of locations in the main memory 12 assigned to the respective input/output channels. Normally the address memory 28 stores two addresses for each input/output channel, one address specifying the next location in main memory to be used in a data transfer operation with the particular I/O control, the the other address specifying the end of the field in main memory available to the I/O control. Associated with the address memory 28 is an input/output address register (IAD) 30 which in turn is coupled to the ADR register 14.

When central control 26 has granted access to a particular I/O channel, it causes the first of the two associated addresses in the address memory 28 to be transferred to the IAD register 30. The address is then transferred to the ADR register 14 and a memory cycle is initiated. The second associated address is also read out of the address memory 28 and compared with the first address in the IAD register 30 by means of a compare circuit 32 which signals to the central control 26 when the two addresses are equal. This information is stored in central control to prevent any further access to memory over the particular channel. The first address, which is now in the ADR register 14, is then incremented to the next address in main memory by the central control 26 and returned to the address memory 28 through the IAD register 30.

Figure 2:
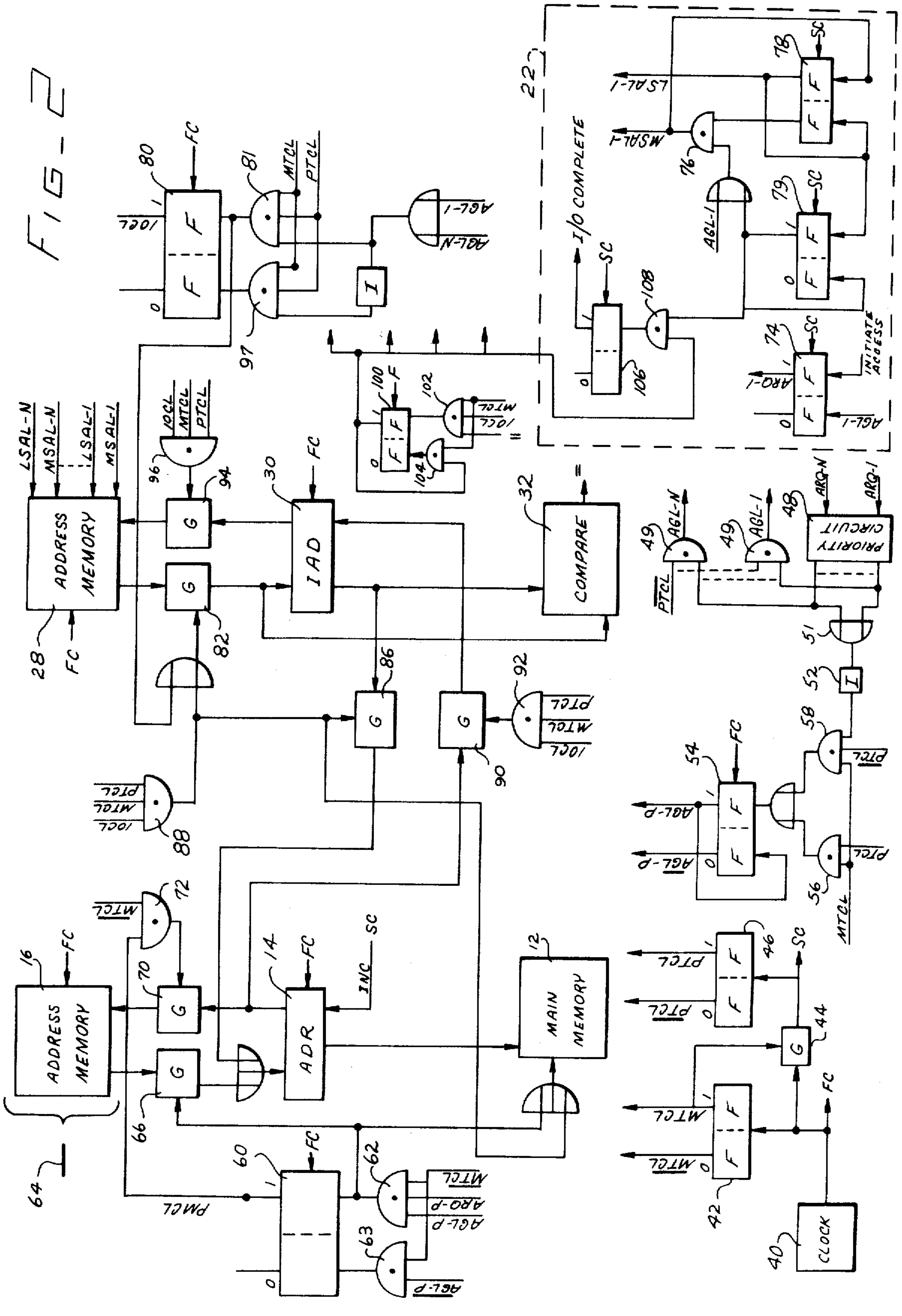
FIG. 2 is a schematic block diagram showing the invention in greater detail.
Figure 3:
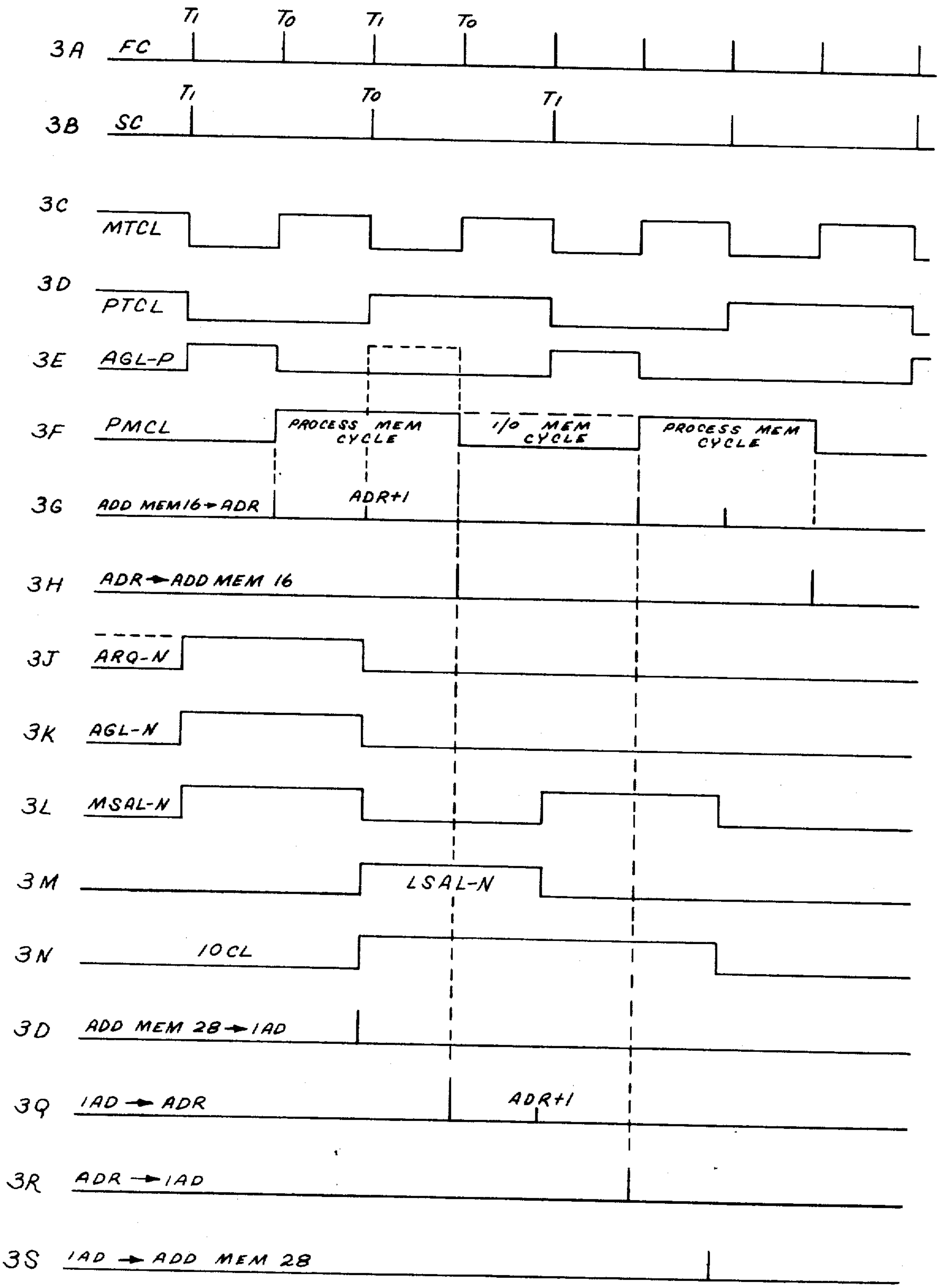
FIG. 3 is a series of waveforms used in explaining the invention.

Referring to FIGS. 2 and 3, there is shown portions of the control circuitry and associated waveforms which are found in the processor 10, the I/O controls 22, and the central control 26 of the computer system of FIG. 1. The control circuitry provides an arrangement by which the processor 10 can operate at a clock rate which is twice that of the I/O controls 22 and 24. This control permits the high speed of the memory and the processor to be utilized to full advantage while still giving priority to the input/output channels whenever they need servicing. The input/output channels can be serviced at their maximum rate based on the lower speed clock and still the processor can be given access to the memory without interrupting or delaying the I/O operation.

Operation of the control circuit is synchronized with a system clock 40, the output of which provides output pulses at the required clock rate necessary for the processor 10, e.g., a 4 MC clock as shown in FIG. 3A. These clock pulses are referred to as the fast clock or FC pulses. The FC pulses are used to complement a control flip-flop 42 which is triggered alternately to the zero state and one state by successive fast clock pulses. The flip-flop 42 provides output levels from the two binary states designated $\overline{\text{MTCL}}$ and MTCL. See FIG. 3C. A gate 44 controlled by the MTCL output of the flip-flop 42 gates alternate fast clock pulses to provide slow clock pulses, designated SC, at half the frequency of the FC pulses. See FIG. 3B. The SC pulses in turn are used to complement a control flip-flop 46 which provides two complementary output levels designated $\overline{\text{PTCL}}$ and PTCL. As shown by FIG. 3D, the waveform of PTCL is a squarewave having a half period corresponding to the interval between SC pulses.

The main memory 12 has a read/write memory cycle which is completed in a time interval corresponding to the time of two successive FC pulse intervals. One memory cycle is required to initiate and complete a read or a write operation for transferring data out of or into the main memory 12 through the INF register 17. Thus, for maximum efficiency and speed of operation, the main memory should be cycled by alternate FC pulses.

While the processor 10, which is synchronized with the FC pulses, can be serviced within one memory cycle, the I/O controls, which are synchronized with the SC pulses, require the equivalent of two memory cycles for servicing during a memory transfer operation. Priority between the processor and the several I/O control channels has therefore been arranged so that the processor has absolute access to the memory during alternate memory cycles. The intermediate memory cycles are then time-shared on a priority basis between the several I/O control channels and the processor, with the processor having lowest priority. This priority control arrangement is provided by the combination of a priority circuit 48 and a control flip-flop 54 which respond to access requests from the processor and I/O control units in the following manner.

Whenever one of the I/O control units requires access to main memory, it provides an Access Request level, designated ARQ–1 through ARQ–N for the respective I/O control units. These levels from the I/O controls are raised to the ON level in synchronism with the SC pulses, as are all control levels in the I/O control units 22. The priority circuit 48 receives the Access Request levels from each of the I/O controls and resolves conflicts between simultaneous access requests on a predetermined priority basis. The priority circuit 48, in response to one or more Access Request levels, provides an output signal on only one of a corresponding number of output lines, thereby limiting the output request signal to only one of the requesting I/O controls having highest priority. The output lines are connected to a plurality of AND circuits 49 to which the $\overline{\text{PTCL}}$ line from control flip-flop 46 is also connected. If $\overline{\text{PTCL}}$ is true, and an access request has been given priority, the output from one of the AND circuits 49 provides an Access Grant level, designated AGL–1 through AGL–N, back to the corresponding I/O control. This initiates a main memory access in a manner hereinafter described in detail.

Access is always granted to the processor whenever no I/O control has requested access. Also, alternate memory cycles are always assigned to the processor. To this end, the output of the control flip-flop 46 is used to provide priority timing for control of a processor priority controlling flip-flop 54, the output of which signals an Access Granted level for the processor, designated AGL–P. This level is set by turning on the flip-flop 54 in synchronism with a fast clock FC whenever the control flip-flops 42 and 46 are set to 1, so that MTCL is true and PTCL is true, as sensed by AND circuit 56. As shown by the waveform of FIG. 3E, AGL–P always goes true at the start of alternate SC intervals as determined by PTCL, providing an Access Granted signal to the processor. Also during the intermediate SC intervals when the control flip-flop 46 is in the opposite state with $\overline{PTCL}$ true, if access has not been requested by any I/O control unit, the control flip-flop 54 is turned on to grant access to the processor 10. This condition is sensed by connecting all of the lines from the output of the priority circuit 48 to an OR circuit 51, the output of which is true only if at least one of the control units has requested access to memory. This output is applied to an inverter 52, the output of which goes true only when none of the I/O controls has requested access to main memory. The output of the inverter 52 is applied to one input of an AND circuit 58 to which the $\overline{PTCL}$ level together with the MTCL level are applied. Thus it will be seen that memory access is granted to the processor on every other slow clock pulse interval absolutely and on the intermediate slow clock pulse intervals whenever no I/O control unit is requesting access.

If the processor 10 is requesting access to main memory, a control flip-flop 60 is turned on with the next FC pulse by the output of an AND circuit 62 which senses that access has been granted to the processor by the flip-flop 54 (AGL–P), that the processor has requested memory access (ARQ–P), and that the control flip-flop 42 is off ($\overline{MTCL}$). The control flip-flop 60 remains on for at least two fast clocks and then is reset by the output of AND circuit 63 if an I/O channel has requested access to memory. See FIG. 3F. At the same time that the processor 10 requests access by setting the ARL–P level, it either provides an address from the NIA register 15, the internal control circuitry 13, or it selects one of the addresses in the processor address memory 16 by means of address control lines 64. The selected address from the address memory 16, for example, is strobed into the ADR register 14 by a gate 66 by the next FC pulse following the granting of access to the processor by the AGL–P level from the control flip-flop 54. To this end, the output of AND circuit 62 is applied to the gate 66 for transferring the selected address to the ADR register 14 input. At the same time, a memory cycle is initiated by the same FC by coupling the output of AND circuit 62 to main memory 12, which results in data being transferred between the processor and the main memory in conventional manner.

Although the memory cycle requires approximately two fast clock intervals or one slow clock interval to be completed, the address in the ADR register 14 is not needed for the full memory cycle. Therefore, the next slow clock SC is used to increment the address in the ADR register so that the address points to the next consecutive cell in main memory. The incremented address is then returned to the address memory 16 by means of a gate 70 strobed by the next FC and controlled by the output of an AND circuit 72 which senses when the control flip-flop 60 is on (PMCL) and the control flip-flop 42 is off ($\overline{MTCL}$). The strobing of the address into and out of ADR register 14 and the incrementing of the address is shown by waveform of FIGS. 3G and 3H.

In the event one of the input/output control units, such as the control unit for channel No. 1, institutes a request, a control flip-flop 74 in the input/output control unit is turned on, providing an ARQ–1 level to the priority circuit 48. As soon as the control flip-flop 46 goes off ($\overline{PTCL}$), the AGL–1 level from the AND circuit 49 goes true. This causes the control flip-flop 74 to be reset by the next slow clock SC. See FIGS. 3J and 3K.

As soon as the line AGL–1 goes on, it causes an address line MSAL–1 from an AND circuit 76 in the I/O control unit 22 to go on. See FIG. 3L. The other input to the AND circuit 76 is derived from the 0 state output of a control flip-flop 78. The MSAL–1 line is applied to the address memory 28 to address the location in the address memory which stores the address of the location in main memory where the next access is to be granted to channel No. 1.

With the address memory 28 addressed by the line MSAL–1, the servicing of the I/O channel No. 1 by main memory is initiated by turning on a control flip-flop 80 by the first fast clock FC after an Access Granted line AGL from one of the AND circuits 49 goes true. To this end, an AND circuit 81 senses that MTCL is true, $\overline{PTCL}$ is true, and one of the AGL lines is on, the output of the AND circuit setting the flip-flop 80 on with the next FC. See FIG. 3N. At the same time the main memory address is transferred from the address memory 28 and strobed by the next FC into the IAD register 30. See FIG. 3P. The transfer is through a gate 82 in response to the output of the AND circuit 81. The address is then transferred into the ADR register 14 by the next fast clock FC through a gate 86 in response to the output of an AND circuit 88, which senses that control flip-flop 80 is on (IOCL), that control flip-flip 42 is off ($\overline{MTCL}$), and that control flip-flop 46 is on (PTCL). See FIG. 3Q. At the same time, the output of the AND circuit 88 initiates a main memory cycle.

Two FC clocks later, the incremented address in the ADR register 14 is gated back to the IAD register 30 by a gate 90 in response to the output of an AND circuit 92 when $\overline{MTCL}$ and $\overline{PTCL}$ are both true. See FIG. 3R. Finally, the address is returned to the address memory 28 by a gate 94 in response to the output of an AND circuit 96 which senses that the flip-flop 80 is on (IOCL), that MTCL is true and $\overline{PTCL}$ is true. See the waveform of FIG. 3S. This completes the servicing of an access request by an input/output control unit. If no AGL line is on, the control flip-flop 80 is reset by the output of an AND circuit 97. Otherwise the I/O service cycle described above is repeated.

It should be noted that the compare circuit 32 compares the first address in the IAD register 14 and the second address from the address memory 28, providing an output signal that is true when the contents of the two registers are true. So that the compare circuit 32 can compare a current address, as addressed by the MSAL line with the address signaling the end of the field, as addressed by a line LSAL from the particular I/O control unit 22 being serviced, the output of the AND circuit 88 is applied to the gate 82. The line LSAL from each I/O control unit, e.g., line LSAL–1, is derived from the control flip-flop 78 and is true when the flip-flop 78 is set to the 1 state. The flip-flop 78 is set to 1 by the next SC after MSAL–1 goes true. LSAL–1 remains true for one SC interval, when the flip-flop 78 is reset. The same SC sets a control flip-flop 79 to the 1 state, causing MSAL–1 to go true again. The next SC turns control flip-flop 79 back to the 0 state, turning off MSAL–1 until the Access Granted line AGL–1 again goes on. Thus at the same time the current address is transferred from the IAD register 30 to the ADR register 14, the address of the end of the block is read from the address memory 28. If the two addresses are equal, a control flip-flop 100 is turned on by the output of an AND circuit 102 that senses the Equal (=) condition from the Compare circuit 32, IOCL, and MTCL. The flip-flop 100 is reset at the next MTCL time by the output of an AND circuit 104. The control flip-flop 100 provides an address equality signal to all the I/O controls 22. A flip-flop 106 in the particular I/O control unit which has been granted access is then set by the output of an AND circuit 108 which senses that flip-flop 100 is on and that flip-flop 79 is on. Turning on of the control flip-flop 106 signals that the input/output operation by the particular I/O control unit is complete.

What is claimed is:

1. A digital computer system comprising a digital processor operating in synchronism with clock pulses at a first frequency, a plurality of input/output units operating in synchronism with clock pulses at a second frequency that is at least half said first frequency, clock pulse generating means for generating clock pulses at said first and second frequencies, the clock pulse generating means being coupled to the processor and to the input/output units, an addressable memory having a memory cycle time for transferring a unit of digital information into or out of a specified address location substantially equal to the period of the second frequency clock pulses, means in each of the input/output units for initiating an access request signal when the respective units are ready to transfer a unit of digital information between the memory and the respective input/output unit, means sending an access granted signal to the processor on alternate ones of the second frequency clock pulse periods, and priority means responsive to said access request signals for sending an access granted signal to any one of the input/output units or the processor on a predetermined priority basis on intermediate ones of the second frequency clock pulse periods.

2. Apparatus as defined in claim 1 further including a buffer register, means responsive to an input/output unit when granted access to main memory for transferring an address associated with the particular input/output unit into the buffer register during one of said alternate clock periods when the processor is granted access to the main memory, the address being transferred from the buffer register, and means for initiating a main memory access to the particular input/output during the next period of the second clock pulse generating means.

3. Apparatus as defined in claim 2 further including first and second address memories, the first address memory storing addresses associated with the processor and the second address memory storing addresses associated with each of the input/output units, means in the processor for reading out an address from the first address memory to the main memory during an access to main memory by the processor, means in each of the input/output units for reading out an associated address from the second address memory to the buffer register during one of said alternate clock periods which the processor is granted access to the main memory.

4. Apparatus of claim 3 wherein the main memory includes an address register associated with the main memory, and further including means directly coupling the address register to the first address memory means during a main memory access initiated by the processor, and means directly coupling the buffer register to the address register during a main memory access initiated by one of the input/output units.

5. A digital computer comprising a processor operating at a first clock frequency, at least one input/output control unit operating at a second clock frequency substantially slower than the first clock frequency, a main memory, control means connected to the processor and main memory for transferring data between the processor and main memory at the clock frequency of the processor, control means connected to the input/output control unit and main memory for transferring data between the input/outut control unit and main memory at the clock frequency of the input/output control unit, the processor and input/output control unit including means generating an access to memory request signal when a transfer of data is needed, means responsive to a request signal from only the processor for granting access to memory by the processor during each clock period at the second clock frequency, and means responsive to request signals from the processor and at least an input/output unit at the same time for granting access to memory alternately by the processor and the requesting input/output unit during successive clock periods at the second clock frequency.

6. A computer system comprising a processor operating at a first clock frequency, at least one input/output unit operating at a second clock frequency at least half the first clock frequency, main memory, first and second address storage units for storing addresses pointing to locations in the main memory associated respectively with the processor and with each of the input/output units, means responsive to an access request signal from the processor for addressing the memory from the first address storage unit and initiating a transfer between the processor and the memory location specified by the address storage unit, the first address storage means being controlled and addressed from the processor at the first clock frequency, the second storage means being controlled and addressed from the requesting input/output units at the second clock frequency, means responsive to an access request from an input/output control unit for addressing the memory from the second address storage unit and initiating a transfer between the input/output control unit and the memory location specified by the address storage unit, said last named means including a buffer register between the second address unit and the main memory for temporarily storing an address from the second address storage.

7. Apparatus of claim 6 further including means connecting the processor to the main memory for a memory access on alternate clock periods at the second clock frequency, and priority control means connecting the processor or an input/output unit on a predetermined priority basis to the main memory during the intermediate clock periods at the second clock frequency.

* * * * *